United States Patent [19]
Nettleton et al.

[11] Patent Number: 5,164,733
[45] Date of Patent: Nov. 17, 1992

[54] PHASE SHIFT DETECTION FOR USE IN LASER RADAR RANGING SYSTEMS

[75] Inventors: John E. Nettleton, Fairfax Station; Dallas N. Barr, Woodbridge, both of Va.

[73] Assignee: The United States of America as represented by the Secretary of the Army, Washington, D.C.

[21] Appl. No.: 827,306

[22] Filed: Jan. 29, 1992

[51] Int. Cl.⁵ .......................... G01S 13/24; G01C 3/08
[52] U.S. Cl. ........................................... 342/54; 356/5; 356/28.5; 342/129
[58] Field of Search .......................... 342/54, 127, 129; 356/5, 28.5

[56] References Cited

U.S. PATENT DOCUMENTS

| | | |
|---|---|---|
| 4,053,886 | 10/1977 | Wright et al. |
| 4,118,701 | 10/1978 | Brey et al. |
| 4,330,721 | 5/1982 | Hauck et al. ........................ 307/425 |
| 4,537,502 | 8/1985 | Miller et al. ............................ 356/5 |
| 4,812,035 | 3/1989 | Freedman et al. ....................... 356/5 |
| 4,830,486 | 5/1989 | Goodwin ................................ 356/5 |
| 4,846,571 | 7/1989 | Jelalian et al. .......................... 356/5 |
| 4,856,893 | 8/1989 | Breen ...................................... 356/5 |
| 4,942,561 | 7/1990 | Ohishi et al. ......................... 368/118 |
| 4,950,075 | 8/1990 | Ichinose et al. ..................... 356/141 |
| 5,020,062 | 5/1991 | Cusack, Jr. et al. .................. 372/23 |

Primary Examiner—John B. Sotomayor
Attorney, Agent, or Firm—Alain L. Bashore; Anthony T. Lane; Milton W. Lee

[57] ABSTRACT

A laser beam is frequency shifted for use in a laser radar ranging system by driving a single optical modulator with multiple drivers to produce several frequency shifted drive frequencies. The shifted beam is transmitted to and from a target via an afocal lens. The return reflected beam, which includes phase shifted information is mixed in a detector with the local oscillator frequency to remove the local oscillator frequency. The electrical output from the detector is filtered by bandpass filters and phase detected in a signal processor to obtain range information.

4 Claims, 2 Drawing Sheets

PHASE SHIFT DETECTION FOR USE IN LASER RADAR RANGING SYSTEMS

BACKGROUND OF THE INVENTION

1. Field of the Invention

The field of the invention disclosed herein is directed to phase shift detection for use in laser radar ranging systems.

2. Description of Related Prior Art

Continuous-wave (CW) radar is a type of radar in which the transmitter output is uninterrupted, as compared to phase radar which consists of short pulses. One of the advantages of CW radar is its ability to measure velocity with extreme accuracy by means of the Doppler shift in the frequency of the echo. In order to measure the range of a target a waveform must be generated by "modulating" or "beating" the continuous wave output into a waveform from which a shift can be measured.

In the prior art, waveform generation has been accomplished with use of Amplitude Modulation (AM), Frequency Modulation (FM), or pulsing schemes for use in microwave and laser radar systems.

AM and FM radar range systems of CW radar utilizes a carrier frequency or carrier amplitude of the transmitted signal which is varied at a uniform rate to produce a waveform. Range is determined by comparing the frequency of the echo with that of the transmitter. An AM system is simple but very inefficient with ambiguity intervals present. The FM system solves the ambiguity intervals yet is very expensive and complicated.

A pulse radar range system is a modified form of either the AM or FM system which employs long or short, but not continuous transmission. This type of system is easy to process and solves the ambiguity interval, but is extremely inefficient and very expensive.

The laser radar range system was developed to overcome the inefficient characteristics of the other systems while taking advantage of the extreme precision inherent to a laser. The laser acts as a carrier wave, but still must be modulated with another type of method to generate a waveform. While this system is extremely precise, there still are problems inherent to this system due to the modulation method used.

There has been a need in the art for a laser radar range system which utilizes inexpensive components and generates an waveform which is efficient without ambiguity intervals within the desired image.

The primary objective of this invention is to provide a method for generating a multiple frequency shifted waveform for use in laser radar ranging systems which is efficient in delivering maximum power available to a target. A secondary objective of this invention is to provide an apparatus for generating a multiple frequency shifts/waveforms in laser radar ranging systems that uses simple inexpensive components.

SUMMARY OF THE INVENTION

The invention disclosed herein is directed to a method and apparatus for phase shift detection in radar range systems. A laser emits a beam with an output frequency which is split into two parts by a beam splitter, a laser beam and local oscillator containing the same frequency. The first part is frequency shifted by an optical modulator that is driven by multiple frequencies after which the shifted beam is passed unaffected through a Brewster Angle plate. The shifted beam is transmitted to and reflected back from a target via an afocal lens, and the reflected beam now contains phase shift information for each corresponding frequencies. The reflected beam is diverted by the Brewster Angle plate on its return path through a quarterwave plate to a second single surface beam splitter where the beam reflects off and is superimposed upon the local oscillator. A detector mixes these two feeds and removes the laser frequency, to output an electronic signal to a signal processor. The signal processor converts the electrical output from the detector, and the modulator driver frequencies, to output phase shift information use to determine range information.

BRIEF DESCRIPTION OF THE DRAWINGS

A full and complete understanding of the invention can be obtained from the following detailed description of the invention when read in conjunction with the annexed drawing in which.

PREFERRED EMBODIMENTS

Figure 1:
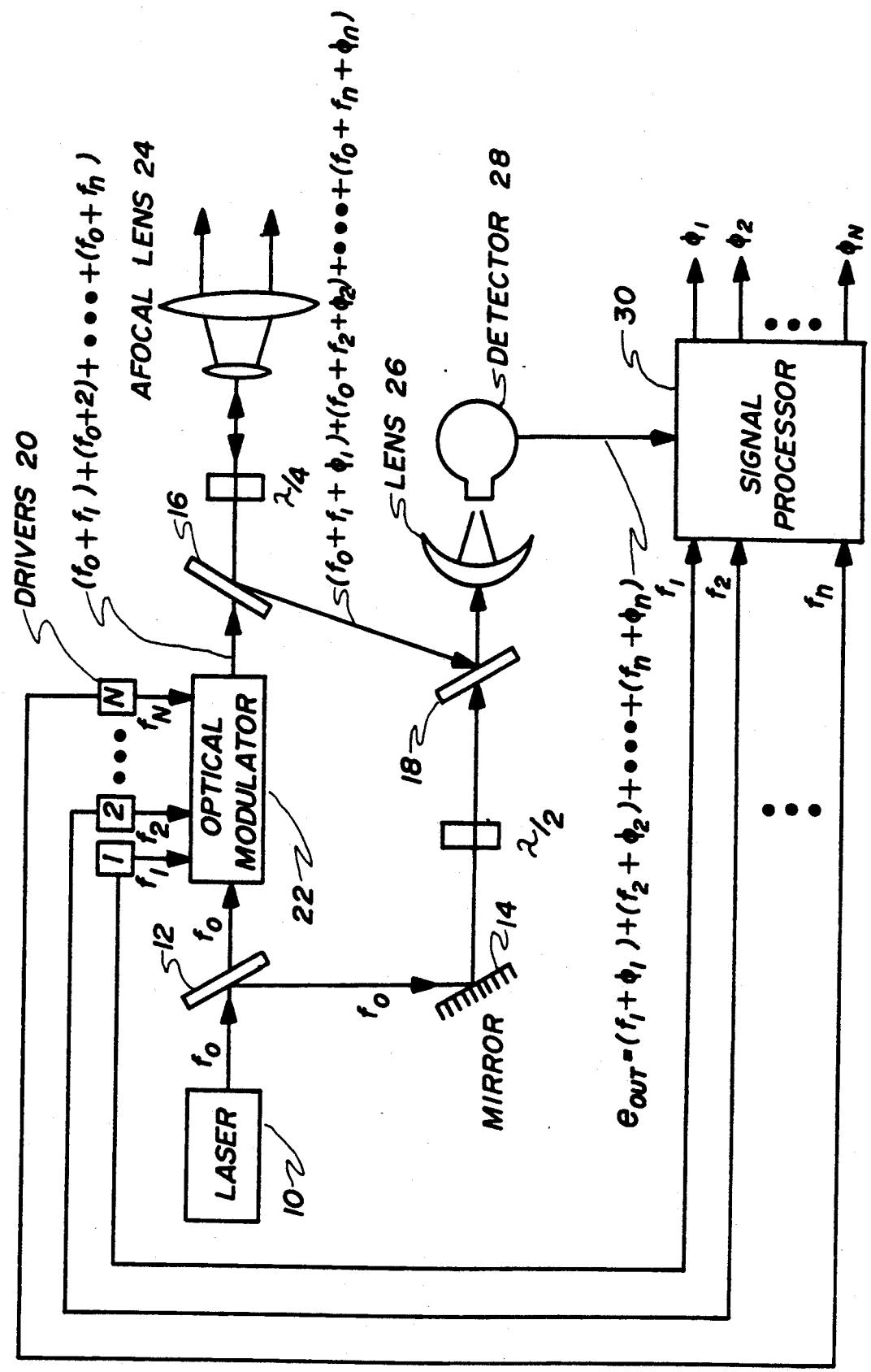
FIG. 1 shows a block diagram of the overall laser range finder of the present invention.
Figure 2:
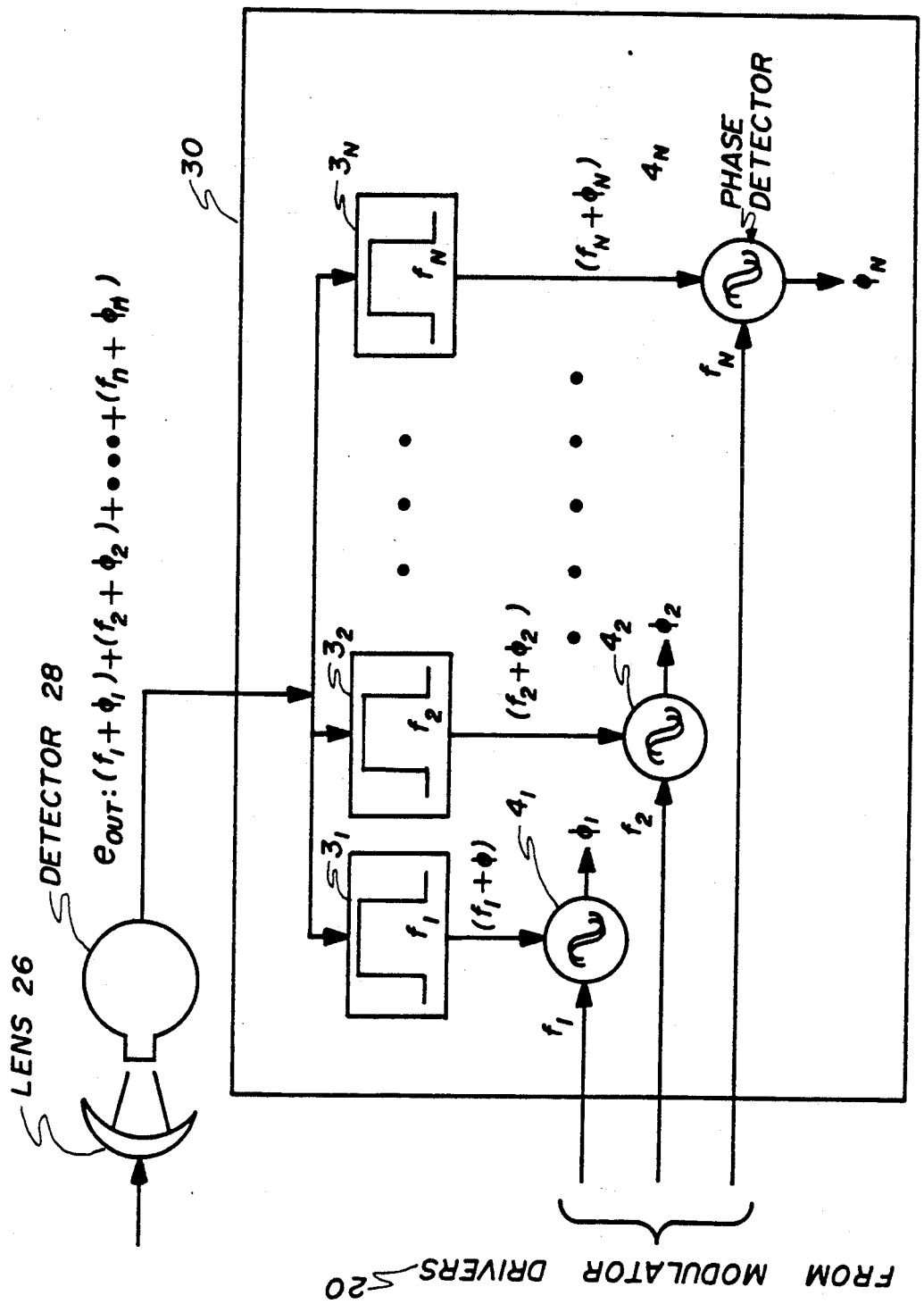
FIG. 2 shows a block diagram of the signal processor of the present invention.

FIG. 1 discloses a laser 10 which outputs an optical beam at a frequency $f_o$. The beam is split at beam splitter 12, into a first and second part consisting of a laser beam and local oscillator, each containing the same frequency. The first part is fed into an optical modulator 22. The modulator is driven by N multiple drivers 20. The output beam is thus frequency shifted by the modulator for each drive frequency $f_1, f_2 \ldots f_n$ to yield an output beam with a multiple shifted frequency $$(f_0+f_1)+(f_0+f_2)+\ldots+(f_0+f_n)$$

The optical beam then passes through a Brewster Angle plate 16 unaffected, and through a quarterwave plate 17 and out to a target through an afocal lens 24.

The returned reflected beam reenters the lens 24 and the return beam contains respective phase shift ($\phi$) information for each frequency, where the shifted multiple frequency beam consists of:

$$(f_0+f_1+\phi_1)+(f_0+f_2+\phi_2)+\ldots+(f_0+f_n\phi_n)$$

Brewster plate 16 diverts the return reflected beam after it has been received back through the lens 24 and quarterwave plate 17 to a second beam splitter 18. At beam splitter 18 the return reflected beam is redirected and superimposed upon the local oscillator beam output by beam splitter 12 (which was reoriented by mirror 14 and through half wave plate 15 to pass unaffected through mirror 18). The superimposed beam is then focused by a detector lens 26 into a detector 28.

Detector 28 mixes the return reflected beam and laser frequency $f_0$ to remove the frequency $f_0$ and output a signal in the electrical realm consisting of:

$$e_{out}=(f_1+\phi_1)+(f_2+\phi_2)+\ldots(f_n+\phi_n).$$

A signal processor 30 processes the detector output along with the drive frequencies from multiple drivers 20 to output the respective phase $\phi_1, \phi_2, \phi_3 \ldots \phi_n$ for each frequency signal inputted. The function of the signal processor 30 will next be discussed.

Figure two shows a block diagram of the signal processor 30. The detector output signal is filtered by bandpass filters $3_1, 3_2, \ldots 3_n$ to yield separate signals $$(f_1+\phi_1), (f_2+\phi_2), \ldots (f_n+\phi_n)$$

These signals are phase detected by phase detectors $4_1, 4_2, \ldots 4_n$ with respect to the correct frequency signal for drivers 20.

The output from signal processor 30 is thus phase detected for each corresponding frequency signal, and contains the range information needed.

The absolute range is obtained by using simple range bin logic (not shown in the drawings) in order to solve for the ambiguity intervals, which are well known in the art.

Industrial applicability of this invention includes but is not limited to: aviation, military, photography, satellite imaging, remote sensing, and range/speed determination in such areas as sports and law enforcement.

This preferred embodiment is not intended to restrict the invention to the precise embodiment or embodiment described.

We claim:

1. A method for phase shift detection used in a laser radar ranging system comprising:
    emitting a laser beam with an output frequency;
    splitting said beam into a laser beam and local oscillator;
    frequency shifting said laser beam of said output frequency to multiple shifted frequencies with an optical modulator driven by multiple frequency drivers;
    transmitting said shifted frequency to a target and obtaining a reflected return beam containing returned shifted multiple frequencies including corresponding phase shifts;
    mixing said local oscillator containing said output frequency with said reflected return beam, removing said laser frequency from said reflected beam, and converting to an electrical multiple phase shifted frequency output;
    processing said electrical frequencies output and driver frequencies to obtain separate phase shift information for each corresponding frequency which yield range information therefrom.

2. The method of claim 1 wherein processing said electrical multiple phase-shifted frequency output and driver frequencies includes:
    filtering said electrical multiple phase-shifted frequency output to obtain separate corresponding frequency and phase; and
    phase detecting with respect to corresponding driver frequency signals.

3. A laser radar ranging system utilizing phase shift detection comprising:
    a laser for generating a laser beam with an output frequency;
    a beam splitter for splitting said output beam into a laser and local oscillator beam;
    an optical modulator driven by multiple frequency drivers which frequency shift said first part of said output frequency to provide multiple shifted frequencies;
    a brewster angle plate mirror through which said multiple shifted frequencies pass through unaffected;
    an afocal lens through which said multiple shifts frequency beam is transmitted to a target and a reflected beam received back through said lens which contain shifted multiple frequencies, including corresponding phase shifts, said reflected beam diverted by said plate after received back through said lens;
    a second beam mirror at which said received beam and said laser oscillator beam is superimposed;
    a detector which mixes said superimposed beam to remove said laser output frequency and obtain an electrical multiple phase-shifted frequency output as detector output;
    a signal processor which processes said detector output and said driver frequencies to output separate phase shift information for each corresponding frequency to yield range information therefrom.

4. The system of claim 3 wherein said signal processor further includes:
    multiple bandpass filters which filter said detector output into separate corresponding frequency with phase; and
    multiple phase detectors which phase detect said corresponding filter outputs and driver frequencies.

* * * * *